Patented Mar. 7, 1939

2,149,517

UNITED STATES PATENT OFFICE 2,149,517

DRIED CORN SIRUP PRODUCT AND METHOD OF PRODUCING THE SAME

Raphael S. Fleming, Syracuse, Frederick D. Parker, Fayetteville, and William Gere Hawley, Syracuse, N. Y., assignors to The Borden Company, New York, N. Y., a corporation of New Jersey No Drawing. Application January 16, 1936, Serial No. 59,408

6 Claims. (Cl. 127—30)

This invention relates to the drying of liquids containing relatively high percentages of dextrose and more particularly to the drying of corn sirup or commercial glucose.

Commercial glucose or corn sirup as now manufactured by inversion of starch contains varying amounts of dextrin, maltose and dextrose, depending on the degree to which inversion has been carried. When the inversion is arrested soon after the disappearance of the starch, the percentage of dextrin is high and of dextrose low. As inversion proceeds, the dextrin decreases and the dextrose increases. There is a considerable amount of maltose present but this does not change greatly excepting that it generally rises a little in amount and then decreases in the later stages of inversion.

From a number of sources, particularly, Bryant and Jones on "Composition of Corn Syrup Unmixed", Industrial & Engineering Chemistry, vol. 25, page 98; and Fetzer, Evans and Longenecker on "Determination of Dextrin, Maltose and Dextrose in Corn Syrup", Industrial & Engineering Chemistry, Analytical edition, vol. 5, page 81; the following analyses are computed for corn sirup taken at different stages of inversion and reduced to 80% total solids:

|  | Low inversion sirup | Medium inversion sirup | High inversion sirup |
|---|---|---|---|
| Dextrin, percent | 46.4 | 33.7 | 29.6 |
| Maltose, percent | 23.9 | 31.7 | 28.2 |
| Dextrose, percent | 9.4 | 14.3 | 21.9 |
| Ash, percent | .25 | .25 | .25 |
| Protein, percent | .05 | .05 | .05 |
| Water, percent | 20.00 | 20.00 | 20.00 |
|  | 100.00 | 100.00 | 100.00 |

On account of the difficulty of measuring dextrose and maltose in the same mixture, it has been common practice to measure the degree of inversion simply by determining the reducing power and to calculate it as if all of the reduction was from dextrose. When expressed in that way the reducing sugar from the above stages of inversion are as follows:

|  | Low inversion sirup | Medium inversion sirup | High inversion sirup |
|---|---|---|---|
| Reducing sugar percent (figured as dextrose) | 23.5 | 33.0 | 38.5 |

In the following discussion, when dextrose is mentioned, reducing sugar figured to dextrose is meant.

As pointed out in the Fleming Patent 1,361,238, the success of the procedure described for producing a powdered mixture of citrus or other fruit juice and glucose solution has been in the selection of a special form of commercial glucose with good drying properties, that is a glucose solution containing less than the normal concentration of dextrose, for example, one containing less than 22% reducing sugar figured as dextrose. With higher concentration of dextrose, difficulties are encountered particularly in the caking or sticking together of the product to form masses or lumps of material or even a semi-liquid gummy mass. Similar difficulties are encountered in the continuous drying of corn sirup alone, containing the normal concentrations of dextrose.

It has now been found that by careful regulation of certain essential details of the procedure, commercial glucose of normal dextrose concentration may be dried and it is an object of this invention to provide an improved process for accomplishing this. It is also an object of the invention to provide an improved process whereby the above mentioned difficulties in the drying of commercial glucose may be avoided and a dry product of pleasing appearance as to texture and color and of good solubility may be obtained. Another object is to provide a process for drying such glucose solutions continuously. A further object is to provide an improved dried corn sirup product. Other objects will become apparent.

In describing the invention, reference will be made to the above mentioned Fleming patent, since the apparatus and general procedure described therein are well suited to the carrying out of the process of the present application. However, it is not intended to thereby restrict the invention to the particular procedures and apparatus described in that patent, it being apparent that the essential features of the present invention may be utilized in other processes and in other types of apparatus.

In carrying out the improved procedure with commercial corn sirup containing about 35% of reducing sugar figured as dextrose, about 32% of dextrin and about 30% of maltose, the solution is first diluted to a total solids content of about 55% when the temperature of the mixture is around 120° F. Some variations, of course, are possible in the concentration and temperature used, although very much higher concentrations will give a material too thick for satisfactory atomization and the use of a much more dilute solution would be uneconomical because of the excess water to be evaporated. With temperatures much cooler than 120° F. the solution should be further diluted by the addition of water and with higher temperatures care must be taken to avoid injury to the sirup.

This diluted solution is atomized at about this temperature and under a pressure of about 3000 to 4500 pounds per square inch and preferably at about 3800 to 4200 pounds per square inch, using an atomizer of the type described in the above mentioned Fleming patent having an opening approximately .037 to .0465 inch in diameter. It is preferred to use an atomizer having an opening approximately .038 inch in diameter. Where the lower pressures within the range described above are used, an atomizer disc having a hole of larger diameter, within the range prescribed above, should be used. With lower pressures than the high given above, for example, with about 4200 pounds per square inch, a product having slightly larger particles, and more readily soluble in water, will be produced.

The diluted solution is atomized under the above conditions into a chamber maintained at an average temperature of about 184° F. At the commencement of the atomization, the chamber will be above the operating temperature. The drying of the atomizing liquid quickly reduces temperature and when equilibrium is reached the temperature should be about 184° F. This temperature is important and should not be allowed to vary by more than about 4° from the optimum. In the preferred practice, every effort should be made to control the average temperatures within the drying chamber between 182 and 186° F. With a corn sirup containing about 30% reducing sugar calculated as dextrose, a lower temperature, for example, 178° F., and a higher pressure, for example 4500 could be used. With the higher percentages of reducing sugars the preferred conditions given should be followed more closely. For example, a corn sirup containing 45% reducing sugar expressed as dextrose or higher may be dried by following the preferred procedure.

The procedure is otherwise carried out as described in the above mentioned Fleming Patent 1,361,238, the air and liquid under pressure being forced into the desiccating chamber in such a way that the liquid is introduced into a current of heated air in atomized condition and carried spirally forward by the heated air and the liquid constituents are substantially completely vaporized. As the powder gravitates to the bottom of the desiccating chamber it may be removed from the chamber and the air may be drawn through a dust collecting or screening device as described in that patent.

By following the above procedure, it is possible to dry this type of sirup (containing 30 to 40% reducing sugar figured as dextrose) continuously for many hours, obtaining a corn sirup powder of pleasing appearance as to texture and color and one of improved solubility and which dissolves readily in water, tea, coffee, etc. A screen analysis of a representative sample of this product gives the following results:

| | Percentage by weight |
|---|---|
| Retained by 35 mesh | .3 |
| Passing 35 mesh but retained by 48 mesh | .7 |
| Passing 48 mesh but retained by 65 mesh | .2 |
| Passing 65 mesh but retained by 100 mesh | 8.9 |
| Passing 100 mesh but retained by 150 mesh | 14.0 |
| Passing 150 mesh but retained by 200 mesh | 38.0 |
| Passing 200 mesh but retained by 220 mesh | 17.4 |
| Passing 220 mesh | 20.5 |
| | 100.0 |

The product dried in this manner has an initial moisture content below 2% which makes it less subject to caking by absorption of a slight amount of moisture during the process of handling and packing of the hygroscopic dried corn sirup.

The above procedure may also be used to advantage with glucose or lower proportions of dextrose or with mixtures of corn sirup and cane sirup.

In describing the invention, the terms used have been used in their descriptive sense and not as terms of limitation and it is intended that all equivalents thereof be included within the scope of the appended claims.

We claim:

1. A method of producing a dried corn sirup product from a corn sirup containing about 30 to 45% of reducing sugar figured as dextrose comprising atomizing a solution of the corn sirup into a desiccating chamber maintained at a temperature of about 178 to 188° F., by forcing the liquid through an orifice having a diameter of .037 to .0465 inch at a pressure of about 3000 to 4800 pounds per square inch.

2. A method of producing a dried corn sirup product from a corn sirup containing about 30 to 45% of reducing sugar figured as dextrose comprising atomizing a solution of the corn sirup into a desiccating chamber maintained at a temperature between about 182 to 186° F., by forcing the liquid through an orifice having a diameter of about .038 inch at a pressure of about 3800 to 4200 pounds per square inch.

3. A method of producing a dried corn sirup product from a corn sirup containing about 30 to 40% of reducing sugar figured as dextrose comprising diluting the corn sirup to a total solids concentration of about 55% at about 120° F. and atomizing the diluted solution into a desiccating chamber maintained at a temperature within about 4 degrees of 184° F., by forcing the liquid through an orifice having a diameter of .037 to .0465 inch at a pressure of about 3000 to 4500 pounds per square inch, the lower pressures being employed with the orifices of larger diameter.

4. A method of producing a dried corn sirup product from a corn sirup containing about 35% of reducing sugar figured as dextrose comprising diluting the corn sirup to a total solids concentration of about 55% at about 120° F. and atomizing the diluted solution into a desiccating chamber maintained at a temperature between about 182 and 186° F., by forcing the liquid through an orifice having a diameter of about .038 inch at a pressure of about 3800 to 4200 pounds per square inch.

5. A method of producing a dried corn sirup product from a corn sirup containing about 30 to 45% reducing sugar figured as dextrose and about 36 to 25% dextrin comprising diluting the corn sirup to a total solids concentration of about 55% at about 120° F. and atomizing the diluted solution into a desiccating chamber maintained at a temperature within about 4 degrees of 184° F., by forcing the liquid through an orifice having a diameter of .037 to .0465 inch at a pressure of about 3000 to 4800 pounds per square inch.

6. A method of producing a dried corn sirup product from a corn sirup containing about 30 to 40% reducing sugar figured as dextrose and about 36 to 28% dextrin comprising diluting the corn sirup to a total solids concentration of about 55% at about 120° F. and atomizing the diluted solution into a desiccating chamber maintained at a temperature between about 182 to 186° F., by forcing the liquid through an orifice having a diameter of .038 inch at a pressure of about 3800 to 4200 pounds per square inch.

RAPHAEL S. FLEMING.
FREDERICK D. PARKER.
WILLIAM GERE HAWLEY.